US011652675B2

(12) United States Patent
Dorn et al.

(10) Patent No.: US 11,652,675 B2
(45) Date of Patent: May 16, 2023

(54) ELECTRICAL PHASE BALANCED DUPLEXER

(71) Applicant: Apple Inc., Cupertino, CA (US)

(72) Inventors: Oliver Georg Dorn, Erlangen (DE);
Björn Lenhart, Nuremberg (DE);
Joonhoi Hur, Sunnyvale, CA (US);
Rastislav Vazny, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/932,665

(22) Filed: Sep. 15, 2022

(65) Prior Publication Data

US 2023/0012540 A1    Jan. 19, 2023

Related U.S. Application Data

(63) Continuation of application No. 17/480,909, filed on Sep. 21, 2021, now Pat. No. 11,522,742, which is a continuation of application No. 17/015,513, filed on Sep. 9, 2020, now Pat. No. 11,368,342.

(51) Int. Cl.
*H04L 27/26* (2006.01)

(52) U.S. Cl.
CPC .................. *H04L 27/2601* (2013.01)

(58) Field of Classification Search
CPC . H04L 1/0041; H04L 1/0045; H04L 27/2601; H04L 27/2602; H04L 5/143; H04L 5/1461; H04L 5/0053
See application file for complete search history.

(56) References Cited

U.S. PATENT DOCUMENTS

| 7,283,793 B1 | 10/2007 | McKay |
| 7,684,776 B2 | 3/2010 | Nation |
| 9,083,441 B2 | 7/2015 | Sahota et al. |

(Continued)

FOREIGN PATENT DOCUMENTS

| CN | 1503591 A | 6/2004 |
| CN | 102332931 A | 1/2012 |

(Continued)

OTHER PUBLICATIONS

Liempd et al.; "An Electrical-Balance Duplexer for In-Band Full-Duplex with <-85dBm In-Band Distortion at +10dBm TX-power", IEEE 2015.

(Continued)

*Primary Examiner* — Khanh C Tran
(74) *Attorney, Agent, or Firm* — Fletcher Yoder PC

(57) ABSTRACT

Embodiments disclosed herein relate to reducing or substantially eliminating an insertion loss caused by isolating a transmit circuit from a receive circuit of an electronic device. To do so, an isolation circuit may be disposed between the transmit circuit and the receive circuit. The isolation circuit may have a first signal path and a second signal path. A first portion of the signal may propagate along the first signal path and a second portion of the signal may propagate along the second signal path. A phase shifter may be disposed on the first signal path to shift a phase of the first portion to match a phase of the second portion. The phase-shifted first portion may be combined with the second portion to reduce or substantially eliminate an insertion loss caused by the isolation circuit.

20 Claims, 8 Drawing Sheets

(56) References Cited

U.S. PATENT DOCUMENTS

| | | | |
|---|---|---|---|
| 9,172,355 B2 | 10/2015 | Sato et al. | |
| 9,197,186 B2 | 11/2015 | Schmidhammer | |
| 9,780,437 B2 | 10/2017 | Knox | |
| 10,419,039 B2 | 9/2019 | Hanaoka | |
| 10,938,542 B1 | 3/2021 | Muharemovic et al. | |
| 11,522,742 B2 * | 12/2022 | Dorn | H04L 27/2601 |
| 2004/0152426 A1 | 8/2004 | Suzuki et al. | |
| 2006/0066419 A1 | 3/2006 | Iwaki et al. | |
| 2008/0144707 A1 | 6/2008 | Tsfati et al. | |
| 2011/0128092 A1 | 6/2011 | Fritz et al. | |
| 2011/0299437 A1 * | 12/2011 | Mikhemar | H04B 1/582 |
| | | | 370/278 |
| 2011/0300814 A1 * | 12/2011 | Mikhemar | H03F 1/56 |
| | | | 455/84 |
| 2011/0300885 A1 * | 12/2011 | Darabi | H04B 1/005 |
| | | | 455/500 |
| 2013/0122831 A1 | 5/2013 | Desclos et al. | |
| 2014/0376419 A1 | 12/2014 | Goel et al. | |
| 2015/0236842 A1 | 8/2015 | Goel et al. | |
| 2015/0270864 A1 * | 9/2015 | Bryant | H04L 5/14 |
| | | | 370/282 |
| 2017/0070217 A1 | 3/2017 | Mandegaran | |
| 2017/0222687 A1 | 8/2017 | Wyville | |
| 2017/0250725 A1 | 8/2017 | Wei | |
| 2017/0358857 A1 | 12/2017 | Watkins | |
| 2019/0198999 A1 | 6/2019 | Ashraf | |
| 2021/0184723 A1 | 6/2021 | Brighenti | |

FOREIGN PATENT DOCUMENTS

| | | |
|---|---|---|
| CN | 105103462 A | 11/2015 |
| GB | 2572883 B | 10/2019 |
| GB | 2572884 B | 1/2020 |
| JP | 2017225105 A | 12/2017 |
| KR | 1020050084476 A | 8/2005 |
| KR | 1020140084285 A | 7/2014 |
| KR | 1020160051640 A | 5/2016 |

OTHER PUBLICATIONS

Korean Office Action for KR Patent Application No. 10-2021-0119517 dated Jul. 12, 2022; 5 pgs.

Chinese Office Action for Chinese Patent Application No. 202111031528.1 dated Dec. 20, 2022; 7 pgs.

Notice of Allowance for Korean Patent Application No. 10-2022-0111978 dated Mar. 13, 2023; 5 pgs.

* cited by examiner

ELECTRICAL PHASE BALANCED DUPLEXER

CROSS-REFERENCE TO RELATED APPLICATION

This application claims priority to and the benefit of U.S. patent application Ser. No. 17/480,909, entitled "ELECTRICAL PHASE BALANCED DUPLEXER", filed Sep. 21, 2021, which claims priority to and the benefit of U.S. patent application Ser. No. 17/015,513, entitled "ELECTRICAL PHASE BALANCED DUPLEXER", filed Sep. 9, 2020, now U.S. Pat. No. 11,368,342, each of which is herein incorporated by reference in its entirety.

BACKGROUND

The present disclosure relates generally to wireless communication systems and more specifically to isolating wireless signals between transmitters and receivers in wireless communication devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In an electronic device, a transmitter and a receiver may each be coupled to an antenna to enable the electronic device to both transmit and receive wireless signals. Certain electronic devices may include isolation circuity having an electrical balanced duplexer (EBD) that isolates the transmitter from received signals, and the receiver from transmission signals, thus reducing interference when communicating. In such electronic devices, an impedance tuner may be used to match the impedance of the antenna to increase effectiveness of this isolation. However, the transmission path for transmission signals sent from the transmitter may branch between the antenna and the impedance tuner. As a result, some of the power used to transmit a transmission signal through the antenna may be lost when the transmission signal branches to the impedance tuner. Similarly, the reception path for received signals received from the antenna may branch between the receiver and the impedance tuner. As a result, some of the power in the received signal received at the receiver may be lost (e.g., insertion loss) when the received signal branches to the impedance tuner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

When using an electrical balanced duplexer (EBD) and impedance tuner, it may be desirable to reduce or recoup the lost power caused by the transmission path or the reception path branching to the impedance tuner (e.g., referred to as "insertion loss"). Embodiments herein provide various apparatuses and techniques to reduce insertion loss while maintaining isolation of the transmitter and receiver of an electronic device. To do so, the embodiments disclosed herein include two circuit paths between an antenna and an isolation circuit. The isolation circuit is disposed between and coupled to a transmitter circuit and a receiver circuit, and isolates the transmitter circuit from received signals and isolates the receiver circuit from transmission signals. The two circuit paths may be combined, such that the power divided between the two paths may be combined together, thus reducing insertion loss by recovering power that may have been lost due to the circuit paths branching (e.g., from the antenna or the isolation circuit).

In some embodiments, the isolation circuit may include a balun (e.g., a transformer balun) that enables signals (e.g., transmission signals) of a first frequency range to pass through to the transmitter circuit (e.g., via a transformer effect) and blocks signals of a second frequency range from passing through to the receiver circuit, while enabling signals (e.g., received signals) of the second frequency range to pass through to the receiver circuit (e.g., via circuit paths) and blocks signals of the second frequency range from passing through to the transmitter circuit. In particular, the balun may receive an input signal (e.g., traveling in a first direction) and output two output signals of opposite polarities (e.g., being 180 degrees out of phase from one another), each having half the power of the input signal. For example, the balun may receive a transmission signal from the transmitter circuitry, and output a first split transmission signal and a second split transmission signal, where the first and second split transmission signals are out of phase with one another by 180 degrees and each have half the power of the original transmission signal. Previously, the first split transmission signal may have been sent to the antenna for transmission, while the second split transmission signal may have traveled to an impedance tuner, where the power from the second split transmission signal may have been lost (e.g., resulting in insertion loss). Instead, the disclosed embodiments may use at least one phase shifter disposed on at least one of the two circuit paths to phase shift at least one of the split transmission signals so that the two split transmission signals are in phase (e.g., have a zero degree difference in phase).

The balun may also receive two input signals (e.g., traveling in directions different from the first direction) and output a combined output signal. For example, the antenna of the electronic device may receive a received signal from the antenna, and split the signal into two halves along the two circuit paths. In cases where splitting the received signal does not cause a phase difference between the two split received signals, the at least one phase shifter may be deactivated so that the split received signals may retain their zero phase difference. The balun may receive the two split received signals and combine them to output a combined received signal, thus recovering the power that may have been previously split off to an impedance tuner. In this way, the embodiments disclosed herein may reduce the insertion loss introduced by the isolation circuit and therefore improve efficiency of operating an EBD.

In one embodiment, an electronic device is presented which includes an enclosure and one or more processors disposed within the enclosure. The electronic device also includes one or more memory devices disposed within the enclosure and coupled to the one or more processors, the one or more memory devices storing instructions, which, when executed by the one or more processors, cause the one or more processors to perform various operations. The electronic device also includes a display disposed at least partially within the enclosure and coupled to the one or more processors. The electronic device also includes one or more antennas disposed within the enclosure. The electronic device also includes transmitter circuitry disposed within the enclosure and configured to transmit a transmission signal to the one or more antennas via the isolation circuitry. The electronic device also includes receiver circuitry disposed within the enclosure and configured to receive a receive signal The electronic device also includes isolation circuitry configured to couple to the one or more antennas via a first signal path and a second signal path, and coupled to the transmitter circuitry and the receiver circuitry and configured to isolate the transmitter circuitry from the receive signal received by the one or more antennas and isolates the receiver circuitry from the transmission signal. The electronic device also includes at least one phase shifter disposed on at least one of the first signal path and the second signal path and configured to shift a phase of at least a portion of the transmission signal therethrough.

In another embodiment, a radio frequency transceiver is presented which includes a transmit circuit configured to transmit a transmission signal. The radio frequency transceiver also includes a receive circuit configured to receive a receive signal. The radio frequency transceiver also includes an isolation circuit configured to couple to one or more antennas, the transmit circuit and the receive circuit, the isolation circuit configured to isolate the transmit circuit from the receive signal and to isolate the receive circuit from the transmission signal, the isolation circuit coupled to the one or more antennas via a first signal path, the isolation circuit configured to couple to the one or more antennas via a second signal path. The radio frequency transceiver also includes at least one phase shifter disposed on at least one of the first signal path and the second signal path, the at least one phase shifter configured to shift a phase of at least a portion of the transmission signal therethrough.

In yet another embodiment, an electronic device is presented which includes means for transmitting a transmission signal. The electronic device also includes means for receiving a receive signal. The electronic device also includes means for isolating the transmitting means from the receive signal and for isolating the receiving means from the transmission signal, the isolating means coupled to a first signal path and a second signal path. The electronic device also includes means for shifting a phase of a first portion of the transmission signal on the first signal path to correlate to a phase of a second portion of the transmission signal on the second signal path. The electronic device also includes means for combining the first portion of the transmission signal on the first signal path and the second portion of the transmission signal on the second signal path into a combined signal. The electronic device also includes antenna means.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Figure 1:
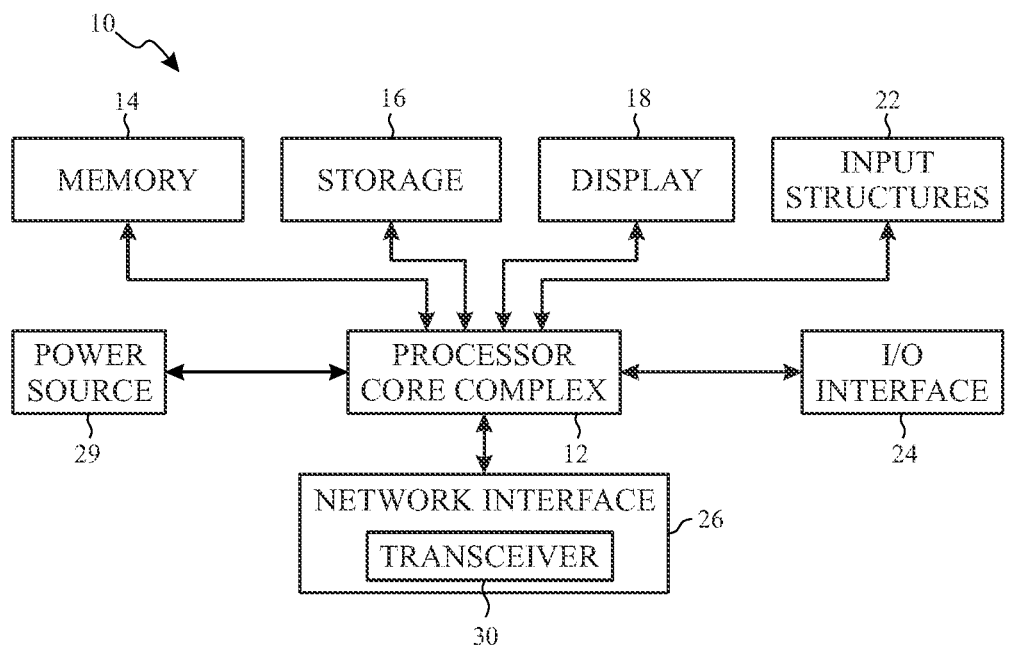
FIG. 1 is a block diagram of an electronic device, according to an embodiment of the present disclosure.

With the foregoing in mind, there are many suitable communication devices that may include and use the transceiver circuitry described herein. Turning first to FIG. 1, an electronic device 10 according to an embodiment of the present disclosure may include, among other things, a processor core complex 12 including one or more processor(s), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
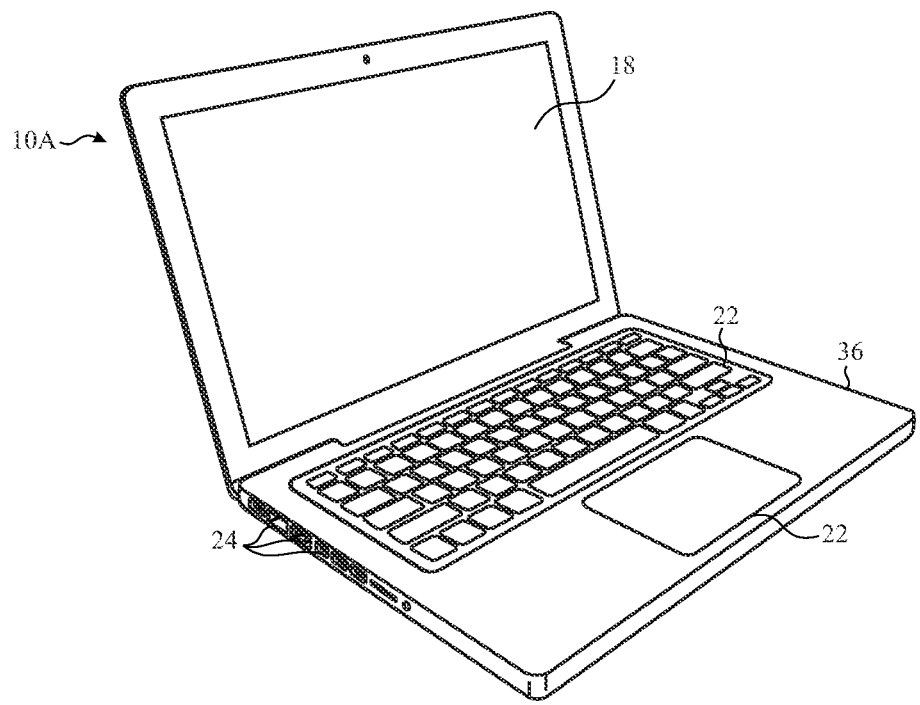
FIG. 2 is a perspective view of a notebook computer representing an embodiment of the electronic device of FIG. 1.
Figure 4:
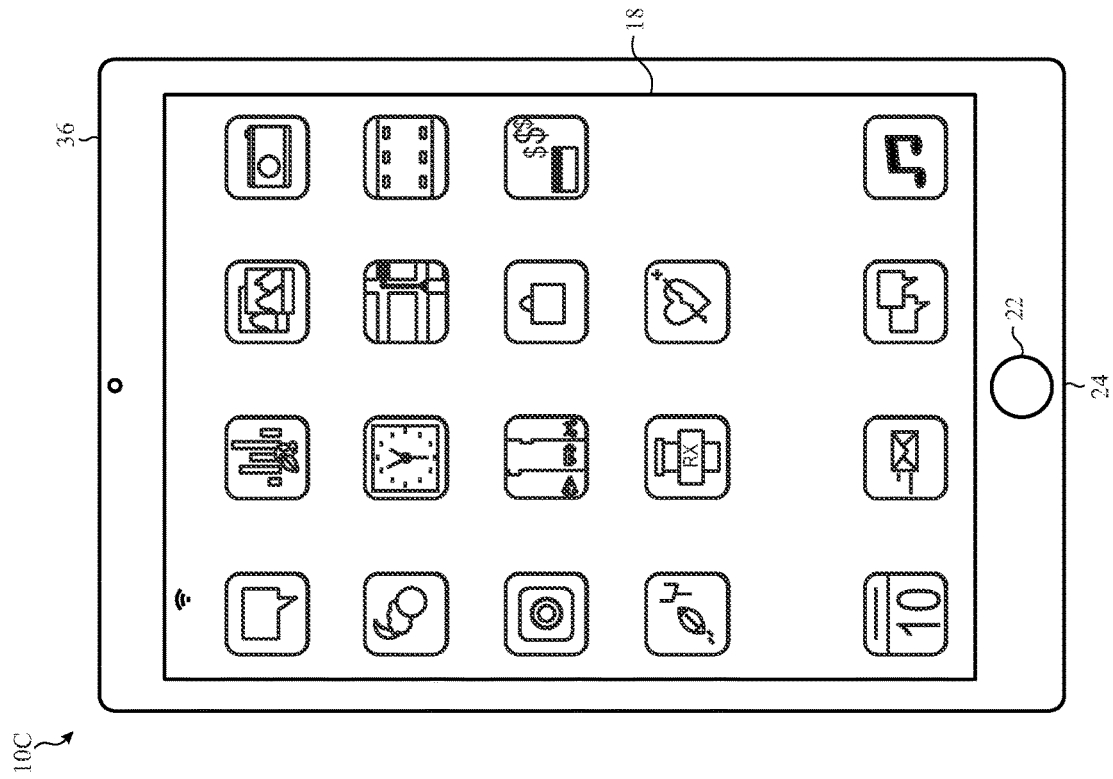
FIG. 4 is a front view of another handheld device representing another embodiment of the electronic device of FIG. 1.
Figure 3:
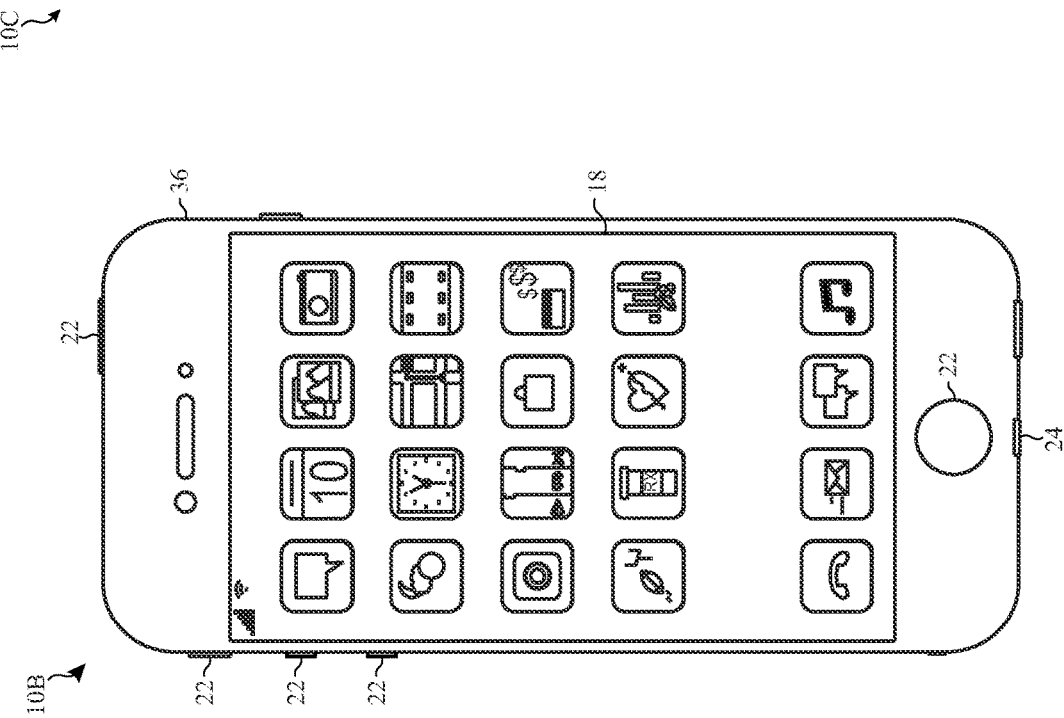
FIG. 3 is a front view of a handheld device representing another embodiment of the electronic device of FIG. 1.
Figure 5:
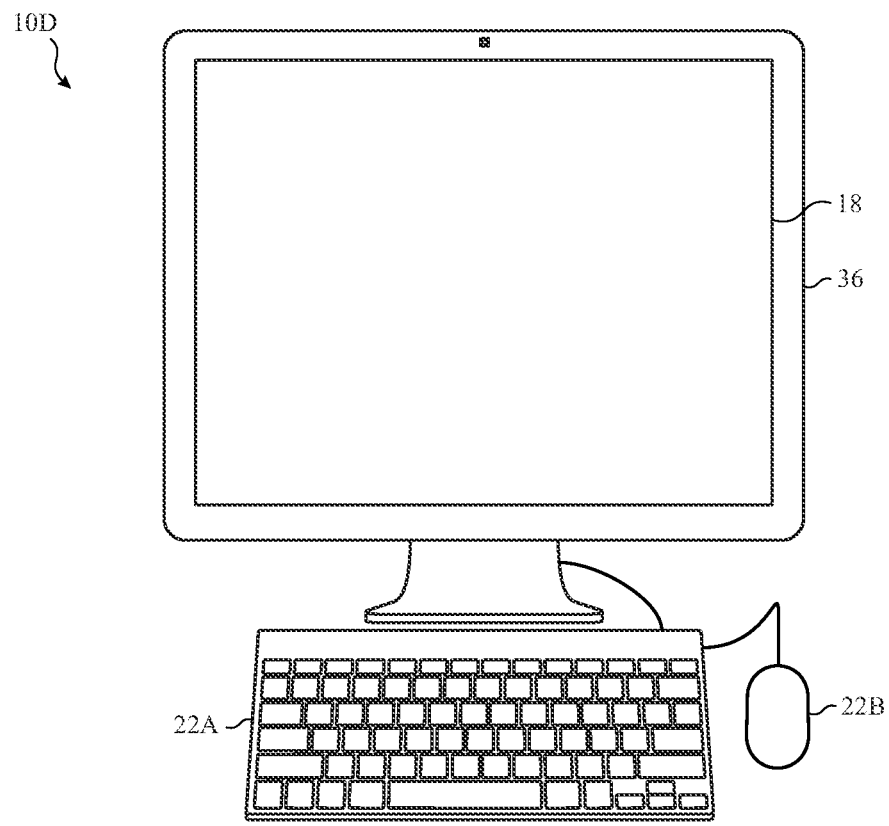
FIG. 5 is a front view of a desktop computer representing another embodiment of the electronic device of FIG. 1.
Figure 6:
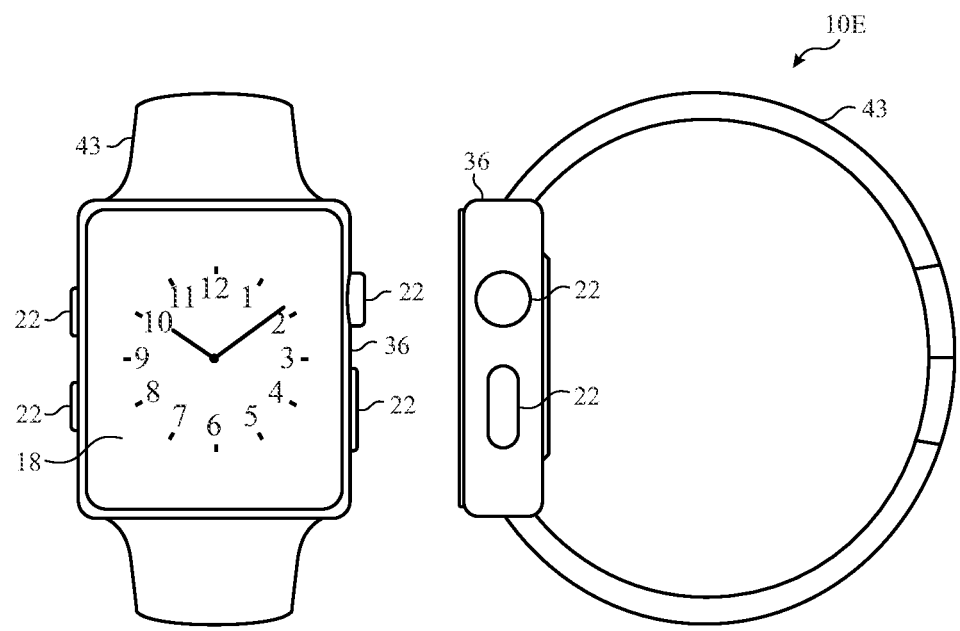
FIG. 6 is a perspective view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. Such programs or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor (s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor core complex 12. The transceiver 30 may support transmission and receipt of various wireless signals via an antenna (not shown in FIG. 1). An impedance of the antenna may disturb the duplex function and degrade isolation between the transmit path and the receive path. To prevent such disruption by the antenna, an antenna tracker may be used to substantially match an impedance of the antenna.

In some embodiments, the transceiver 30 may include a duplexer (not shown in FIG. 1). A duplexer enables bidirectional communication over a single path while separating signals traveling in each direction from one another. For example, the duplexer may isolate a transmitter of the electronic device 10 from a received signal and/or isolate a receiver of the electronic device 10 from a transmission signal (e.g., isolate the transmitter from the receiver, and vice versa). In some embodiments, the duplexer may include a balance-unbalance transformer (e.g., a balun) that isolates the transmitter from a received signal and/or isolates the receiver from a transmission signal.

In some embodiments, the electronic device 10 communicates over various wireless networks (e.g., WI-FI®, WIMAX®, mobile WIMAX®, 4G, LTE®, 5G, and so forth) using the transceiver 30. The transceiver 30 may transmit and receive RF signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. The power source 29 of the electronic device 10 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may allow a user to control the handheld device 10B. For example, the input structures 22 may activate or deactivate the handheld device 10B, navigate the user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or another similar device by Apple Inc. of Cupertino, Calif. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may operate using the techniques described herein. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

As mentioned above, the transceiver 30 of the electronic device 10 may include a transmitter and a receiver that are coupled to an antenna to enable the electronic device 10 to transmit and receive wireless signals. Certain electronic devices may include isolation circuity having an electrical balanced duplexer (EBD) that isolates the transmitter from received signals, and the receiver from transmission signals, thus reducing interference when communicating. In such electronic devices, an impedance tuner may be used to match the impedance of the antenna to increase effectiveness of this isolation. However, the transmission path for transmission signals sent from the transmitter may branch between the antenna and the impedance tuner. As a result, some of the power used to transmit a transmission signal through the antenna may be lost when the transmission signal branches to the impedance tuner. Similarly, the reception path for received signals received from the antenna may branch between the receiver and the impedance tuner. As a result, some of the power in the received signal received at the receiver may be lost (e.g., insertion loss) when the received signal branches to the impedance tuner.

Embodiments herein provide various apparatuses and techniques to reduce insertion loss while maintaining isolation of the transmitter and receiver of the electronic device 10. To do so, the embodiments disclosed herein include two circuit paths between an antenna and an isolation circuit.

The two circuit paths may be combined, such that the power divided between the two paths may be combined together, thus reducing insertion loss by recovering power that may have been lost due to the circuit paths branching (e.g., from the antenna or the isolation circuit).

Figure 7:
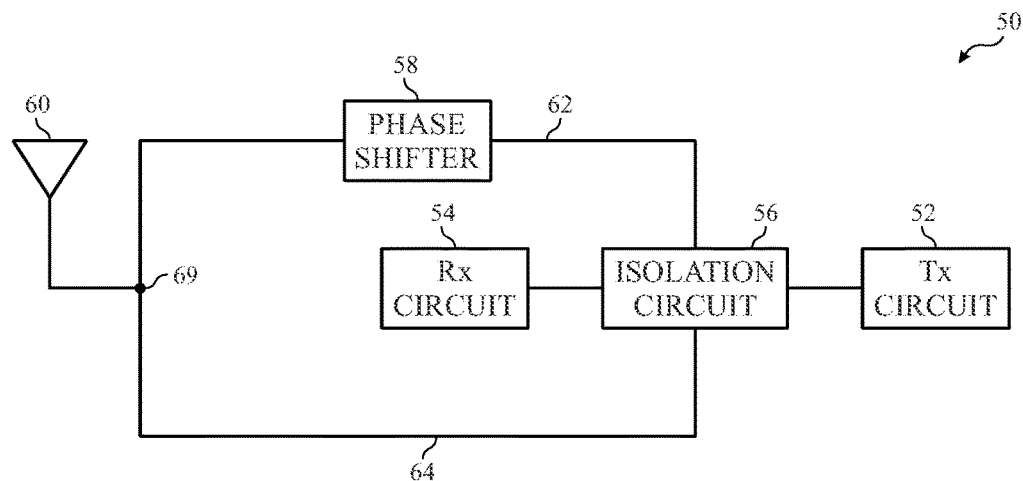
FIG. 7 is a schematic diagram of an example transceiver circuitry of the electronic device of FIG. 1, according to an embodiment of the present disclosure.

With the foregoing in mind, FIG. 7 is a schematic diagram of an example transceiver circuitry 50 of the electronic device 10, according to an embodiment of the present disclosure. In some embodiments, the example transceiver circuitry 50 may be disposed in the transceiver 30 discussed with respect to FIG. 1. In other embodiments, the transceiver circuitry 50 may be disposed in the network interface and coupled to the transceiver 30. As illustrated, the transceiver circuitry 50 includes an isolation circuit 56 disposed between a transmit (TX) circuit 52 and a receive (RX) circuit 54. The isolation circuit 56 is coupled to the TX circuit 52 and is coupled to the RX circuit 54. The isolation circuit 56 enables frequency division duplexing (FDD) by allowing signals (e.g., transmission signals) of a first frequency range to pass through to the TX circuit 52 (e.g., via a transformer effect) and blocks signals of a second frequency range from passing through to the RX circuit 54, while enabling signals (e.g., received signals) of the second frequency range to pass through to the RX circuit 54 (e.g., via circuit paths) and blocks signals of the second frequency range from passing through to the TX circuit 52. Each frequency range may be of any suitable bandwidth, such as between 1 and 100 gigahertz (GHz) (e.g., 10 megahertz (MHz)), and include any suitable frequencies. For example, the first frequency range (e.g., the TX frequency range) may be between 880 and 890 MHz, and the second frequency range (e.g., the RX frequency range) may be between 925 and 936 MHz.

A first path 62 and a second path 64 each couple the isolation circuit 56 to an antenna 60 via a node 69. The first path 62 and the second path 64 may be bidirectional paths along which a signal to be transmitted (e.g., a TX signal) splits and travels from the TX circuit 52 to the antenna 60. Similarly, a signal received via the antenna 60 (e.g., an RX signal) may split and travel along the first path 62 and the second path 64 to the RX circuit 54.

In some embodiments, a signal from the TX circuit 52 (e.g., the TX signal) may be divided by the isolation circuit 56. In that case, a first portion of the TX signal may propagate along the first path 62 and a second portion of the TX signal may propagate along the second path 64. The first portion of the signal and the second portion of the signal may be combined at the node 69. Similarly, a signal received via the antenna 60 may be split into a first portion of the RX signal and a second portion of the RX signal. The first portion of the RX signal may propagate along the first path 62 and the second portion of the RX signal may propagate along the second path 64. The first and second portions of the RX signal may be combined at the isolation circuit 56 and provided to the RX circuit 54. Splitting the TX signal at the isolation circuit from the TX circuit 52 or the RX signal at the node 69 from the antenna 60, without combining the split signals back together, may cause an insertion loss equal to about half of a power of the TX signal output from the TX circuit 52 or about half of a power of the RX signal output from the antenna 60, respectively. In some embodiments, the insertion loss is about 3 decibels (dB).

In some embodiments, the isolation circuit 56 may include a balun (e.g., a transformer balun) that enables signals (e.g., transmission signals) of a first frequency range to pass through to the TX circuit 52 (e.g., via a transformer effect) and blocks signals of a second frequency range from passing through to the RX circuit 54, while enabling signals (e.g., received signals) of the second frequency range to pass through to the RX circuit 54 (e.g., via circuit paths) and blocks signals of the second frequency range from passing through to the TX circuit 52. In particular, the balun of the isolation circuit 56 may receive a TX signal from the TX circuit 52, and output a first split TX signal on the first path 62 and a second split TX signal on the second path 64, where the first and second split TX signals are out of phase with one another (e.g., by approximately 180 degrees) and each have half the power of the original TX signal. Previously, the first split TX signal may have been sent to the antenna 60 for transmission, while the second split TX signal may have traveled to an impedance tuner, where the power from the second split TX signal may have been lost (e.g., resulting in insertion loss). Similarly, the antenna of the electronic device may have received an RX signal from the antenna 60, and split the RX signal into first and second split RX signals, where the first RX split signal may have been sent to the RX circuit 54 for processing, while the second split RX signal may have traveled to the impedance tuner, where the power from the second split RX signal may have been lost (e.g., again resulting in insertion loss).

Accordingly, the disclosed embodiments include one or more phase shifters 58 that may be disposed along the first path 62 and/or the second path 64. The one or more phase shifters 58 may shift a phase of a signal along a respective path 62, 64 to substantially correlate or match a phase of a signal along the other path 62, 64. As illustrated, a phase shifter 58 is disposed on the first path 62. Thus, the phase shifter 58 may shift a phase of a portion of the TX signal along the first path 62. In some embodiments, the phase shifter 58 or an additional phase shifter may be disposed on the second path 64. Because the phase of the first portion of the TX signal on the first path 62 may be about 180 degrees out of phase compared to the second portion of the TX signal on the second path 64, the phase shifter 58 may shift a phase of the first portion of the TX signal on the first path 62 by about 180 degrees. After the phase of the first portion of the TX signal is shifter by the phase shifter 58, the phase-shifted first portion and the second portion of the TX signal are substantially in-phase with each other.

It should be understood that any combination of shifting of the two portions of the TX signal on the first path 62 and the second path 64 may be used to place the two portions of the TX signal in-phase with one another. For example, the phase shifter 58 may shift the phase of the first portion of the TX signal by about +90 degrees, and a second phase shifter disposed on the second path 64 (not shown in FIG. 7) may shift a phase of the second portion of the TX signal by about −90 degrees.

Because the RX signal received at the antenna 60 may be split at the node 69 without causing a phase difference between a first portion of the RX signal traveling along the first path 62 and a second portion of the RX signal traveling along the second path 64, the phase shifter 58 may not shift a phase of an RX signal from the antenna to the isolation circuit 56 along the first path 62. As illustrated, the node 69 is in the form of a "T-line" junction (e.g., three circuit paths joined together at the node 69). In additional or alternative embodiments, the node 69 may include a combiner circuit or device as discussed in FIG. 9 below, such as a Wilkinson power divider, a capacitor, or the like. As such, the phase shifter 58 may be deactivated for RX signals, and thus be a unidirectional phase shifter. In other embodiments, the node 69 may cause a phase difference (e.g., approximately a 180 degree phase difference) between the first portion of the RX signal traveling along the first path 62 and the second portion of the RX signal traveling along the second path 64, and, as such, the phase shifter 58 may be bidirectional and shift a phase of the first portion of the RX signal traveling along the first path 62 and/or the second portion of the RX signal traveling along the second path 64 to ensure that the portions of the RX signal are in phase, as discussed in with respect to FIG. 9. In such cases, the node 69 may include, for example, a balun, which may cause the phase difference between the two portions of the RX signal.

Advantageously, shifting a phase of the first portion of the TX signal on the first path 62 enables that signal to be combined with a second portion of the TX signal on the second path 64. Thus, the two signals along the respective paths 62, 64 can be constructively combined at the node 69 prior to propagate to the antenna 60, thus recovering power lost in the TX signal due to splitting from the isolation circuit 56. Thus, insertion loss caused by splitting the TX signal at the isolation circuit 56 may be reduced by combining the circuit paths 62, 64 and using the transceiver circuitry 50.

Similarly, the first portion of an RX signal on the first path 62 may be combined with the second portion of the RX signal on the second path 64 at the isolation circuit 56. The RX signal received at the antenna 60 may be in single-ended mode. Thus, the first portion of the RX signal on the first path 62 is in-phase with the second portion of the RX signal on the second path 64. In that case, the first and second portion RX signal need not be phase shifted. The isolation circuit 56 combines the first and second portion of the RX signal, thereby recovering power lost due to splitting the RX signal, thus reducing insertion loss.

Figure 8A:
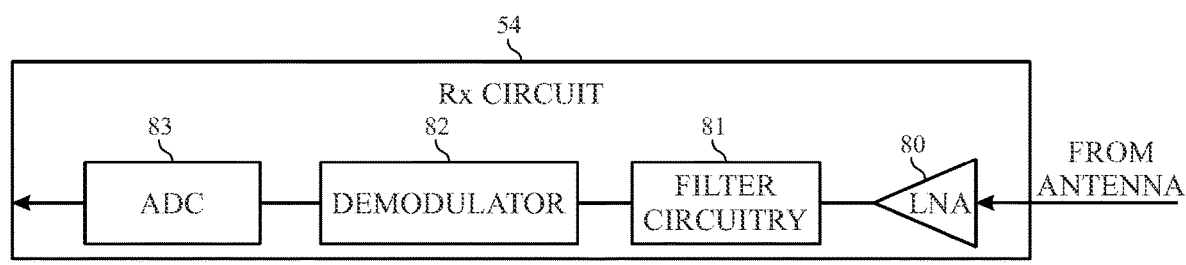
FIG. 8A is a schematic diagram of a receiver circuit of the example transceiver circuitry of FIG. 7, according to an embodiment of the present disclosure.

FIG. 8A is a schematic diagram of the receive circuit (e.g., the RX circuit) 54, according to an embodiment of the present disclosure. As illustrated, the RX circuit 54 may include, for example, a low noise amplifier (LNA) 80, filter circuitry 81, a demodulator 82, and an analog-to-digital converter (ADC) 83. One or more signals received by the antenna 60 may be sent to the RX circuit 54 via the isolation circuit 56. In some embodiments, the RX circuit 54 may include components in addition to or alternative to the LNA 80, filter circuitry 81, the demodulator 82, and the ADC 83, such as a mixer, a digital down converter, and the like.

The LNA 80 and filter circuitry 81 may receive the combined RX signal (e.g., the first and the second portions of the RX signal) received by the antenna 60 and combined by the isolation circuit 56. The LNA 80 may amplify the combined RX signal to a suitable level for the rest of the circuitry to process.

The filter circuitry 81 may include one or more types of filters such as bandpass filter, a low pass filter, or a decimation filter, or any combination thereof. The filter circuitry 81 may remove undesired noise from the RX signal, such as cross-channel interference. The filter circuitry 81 may also remove additional signals received by the antenna 60 which are at frequencies other than the desired signal.

Figure 8B:
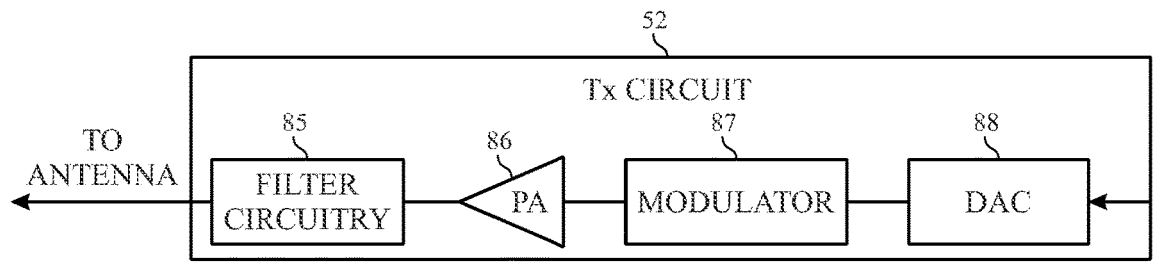
FIG. 8B is a schematic diagram of a transmitter circuit of the example transceiver circuitry of FIG. 7, according to an embodiment of the present disclosure.

The filtered RX signal is sent to the demodulator 82. The demodulator 82 may remove the RF envelope and extract a demodulated signal from the filtered RX signal for processing. The ADC 83 receives the demodulated analog signal and converts the signal to a digital signal so that it can be further processed by the electronic device 10. FIG. 8B is a schematic diagram of the transmission circuit (e.g., the TX circuit) 52, according to an embodiment of the present disclosure. As illustrated, the TX circuit 52 may include, for example, filter circuitry 85, a power amplifier (PA) 86, a modulator 87, and a digital-to-analog converter (DAC) 88. In some embodiments, the TX circuit 52 may include components in addition to or alternative to the filter circuitry 85, the PA 86, the modulator 87, and the DAC 88 such as a digital up converter, etc.

A digital signal containing information to be transmitted via the antenna 60 is provided to the DAC 88. The DAC 88 converts the digital signal from the transmitter 89 to an analog signal. The modulator 87 may combine the converted analog signal with a carrier signal to generate a radio wave.

Figure 9:
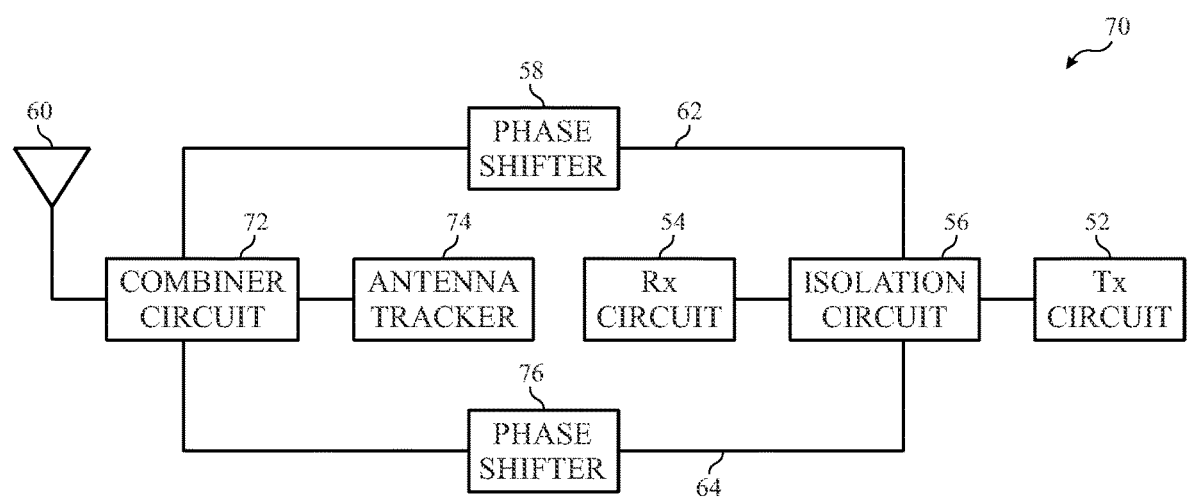
FIG. 9 is a schematic diagram of the example transceiver circuitry of FIG. 7 with a combiner circuit and antenna tracker, according to an embodiment of the present disclosure.

The PA 86 receives signal the modulated signal from the modulator 87. The PA 86 amplifies the modulated signal to a suitable level to drive transmission of the signal via the antenna 60. Similar to the filter circuitry 81, the filter circuitry 85 of the TX circuit 52 may remove undesirable noise from the amplified signal to be transmitted via the antenna 60. In some embodiments, a PA, such as the PA 86, may be disposed within the transmitter in addition to or alternative to the PA 86 in the TX circuit 52. FIG. 9 is a schematic diagram of an example transceiver circuitry 70 of the electronic device 10 with a combiner circuit 72 and an antenna tracker 74, according to an embodiment of the present disclosure. The transceiver circuitry 70 includes a first phase shifter 58 on the first path 62 and a second phase shifter 76 on the second path 64. The combiner circuit 72 is coupled to the first path 62, the second path 64, and the antenna 60. That is, the combiner circuit 72 takes the place of the node 69 discussed with respect to FIG. 7. The antenna tracker 74 is coupled to the combiner circuit 72 opposite the antenna 60.

The first phase shifter 58 and the second phase shifter 76 are configured such that the signals output from each of the phase shifters 58, 76 are in-phase. In some embodiments, the phase shift of the first phase shifter 58 may be opposite the phase shift of the second phase shifter 76. In that case, for example, if the first phase shifter 58 provides a phase shift of +90 degrees, the second phase shifter 76 may provide a phase shift of −90 degrees. Similarly, if the first phase shifter 58 provides a phase shift of +10 degrees, the second phase shifter 76 may provide a phase shift of −10 degrees. However, during operation, the actual phase shift of the phase shifters 58, 72 may not be opposite but are sufficient to enable the shifted signals from the phase shifters 58, 76 to be constructively combined. That is, without the phase shifters 58, 76, if the signal on the first path 62 and the signal on the second path 64 may be out-of-phase. Thus, if the signal on the first path 62 and the signal on the second path 64 were combined without placing the signals in phase, an amplitude of the combined signal may be reduced compared to the original signal from the TX circuit 52 or the antenna 60. As such, an insertion loss caused by the isolation circuit 56 might be amplified without placing the signals in phase.

The combiner circuit 72 may combine the shifted signals from the phase shifter 58, 76 and provide the combined signal to the antenna 60 to be transmitted therefrom. The combiner circuit 72 may include any RF combiner circuit, such as a balun, a Wilkinson power divider, a capacitor, a node, a T-line junction, and the like. Depending on the type of combiner circuit 72 used, the combiner circuit 72 may shift a phase of a portion of a signal received by the antenna 60. For example, a signal received at the antenna 60 may be split into a first portion propagated along the first path 62 and a second portion propagated along the second path 64. However, the combiner circuit 72 may shift a phase of at least one of the first portion and the second portion. Such is the case if the combiner circuit 72 is implemented as a balun (e.g., a transformer balun). In that case, the phase shifters 58, 76 may shift a phase of at least a respective portion of the received signal such that the first portion of the signal is in-phase with the second portion of the signal at the isolation circuit 56. The first portion and the second portion are then combined at the isolation circuit 56 and provided to the RX circuit 54. Thus, the phase shifters 58, 76 may be bidirectional phase shifters and shift an RX signal propagating from the antenna 60 to the isolation circuit 56, as well as a TX signal propagating from the isolation circuit 56 to the antenna 60.

The antenna tracker 74 has an adjustable impedance to offset an imbalance between an impedance of the antenna 60 and an impedance of the isolation circuit 56. That is, the antenna tracker 74 may be adjusted to offset a change of an impedance of the antenna 60. For example, if the impedance of the antenna 60 changes, an impedance mismatch condition may occur because the impedance of the antenna 60 does not match an impedance of the isolation circuit 56. An impedance mismatch may reduce effectiveness of the isolation of the TX and RX circuits 52, 54, resulting in inferior communication quality. In that case, the impedance of the antenna tracker 74 may be adjusted such that the impedance mismatch condition of the antenna 60 is substantially reduced. That is, the impedance of the antenna tracker 74 is adjusted to balance the impedance of the antenna 60.

Advantageously, the phase shifters 58, 76 increase or maximize the recovered power that would have been lost due to the isolation circuit 56 and/or the combiner circuit 72 by enabling the signal on the first path 62 to be constructively combined with the signal on the second path 64. Further, the antenna tracker 74 increase or maximizes the isolation between the TX circuit 52 and the RX circuit 54 by offsetting an impedance mismatch between the impedance of the antenna 60 and the impedance of the isolation circuit 56.

Figure 10:
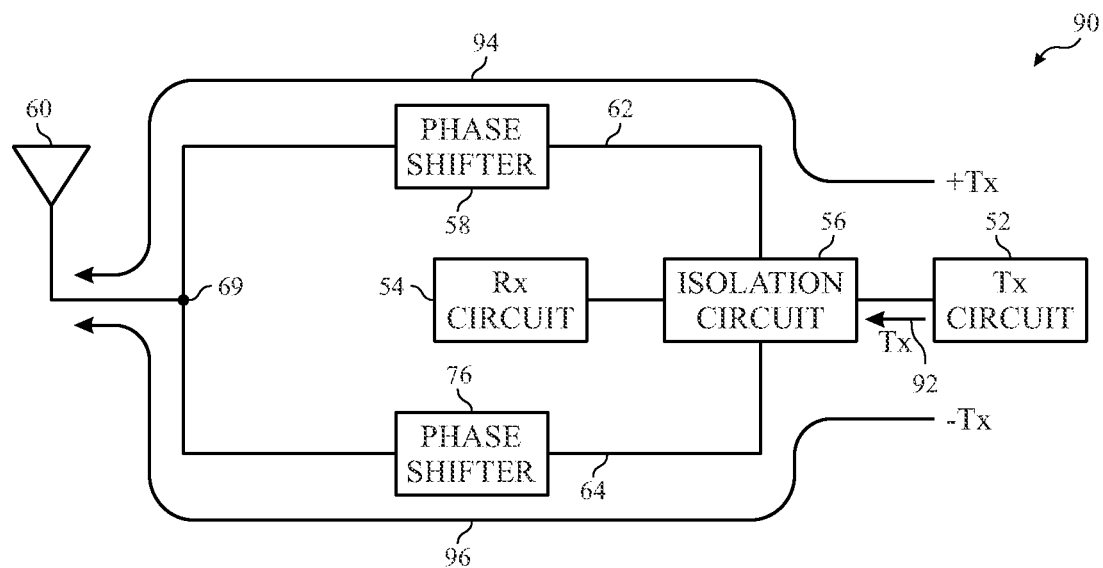
FIG. 10 is a schematic diagram of an example transceiver circuitry of the electronic device of FIG. 1 illustrating a path of a transmission (TX) signal, according to an embodiment of the present disclosure.

FIG. 10 is a schematic diagram of an example transceiver circuitry 90 of the electronic device 10 illustrating a path of a transmission (TX) signal, according to an embodiment of the present disclosure. The example transceiver circuitry 90 is substantially similar to the schematic diagram of the transceiver circuitry 50 in FIG. 7, except that the transceiver circuitry 90 includes a phase shifter 76 on the second path 64 and depicts example paths 94, 96 of a TX signal propagating through the transceiver circuitry 50. Although not shown, the antenna tracker 74 discussed with respect to FIG. 9 may be included in the transceiver circuitry 90 to improve isolation between the RX circuit 54 and the TX circuit 25.

As discussed above, the TX signal 92 is provided to the isolation circuit 56 by the TX circuit 52 to be transmitted via the antenna 60. In addition to preventing an RX signal from entering the TX circuit 52, the isolation circuit 56 also splits the TX signal 92 into a first portion (+TX) 94 and a second portion (−TX) 96. The first portion (+TX) 94 propagates along the first path 62 and the second portion (−TX) 96 propagates along the second path 64.

As discussed above, a phase of the first portion (+TX) 94 may be out of phase from the second portion (−TX) 96 due to the isolation circuit 56. Thus, the phase shifters 58, 76 shift a phase of the respective portions of the TX signal 92 such that the first portion (+TX) 92 and the second portion (−TX) 96 are substantially in-phase at the node 69. As discussed above, in some embodiments, one or both phases of the first and second portions 94, 96 may be shifted as long as the phases of the respective portions are substantially in-phase at the node 69. Shifting a phase of the one or both of the portions 94, 96 enables the portions 94, 96 to be constructively combined at the node 69, thereby reducing or substantially eliminating the insertion loss caused by the isolation circuit.

Figure 11:
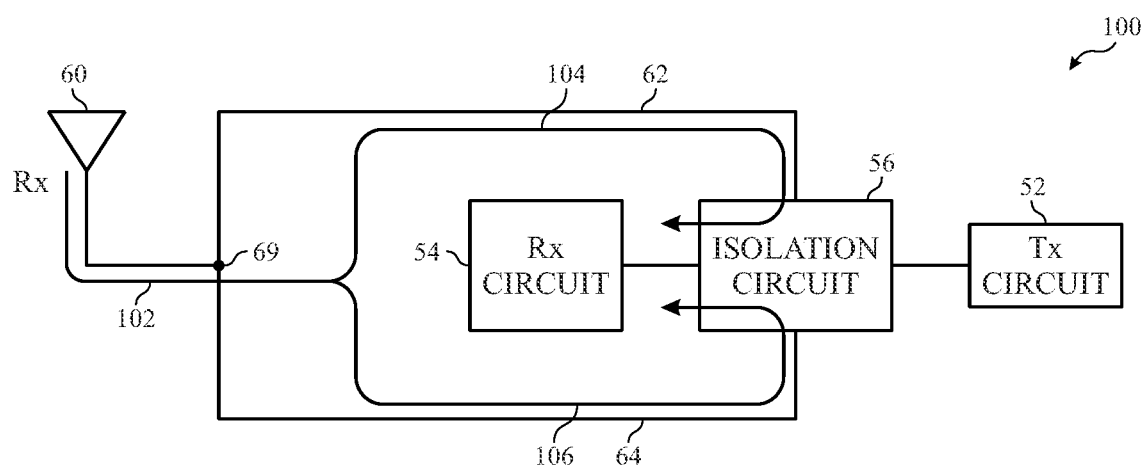
FIG. 11 is a schematic diagram of an example transceiver circuitry of the electronic device of FIG. 1 illustrating a path of a received (RX) signal, according to an embodiment of the present disclosure.

FIG. 11 is a schematic diagram of an example transceiver circuitry 100 of the electronic device 10 illustrating a path of a received (RX) signal, according to an embodiment of the present disclosure. The transceiver circuitry 100 is substantially similar to the schematic diagram of the transceiver circuitry 50 in FIG. 7 except that the transceiver circuitry 90 does not include the phase shifter 58 and depicts example paths 104, 106 of a RX signal 102 propagating through the transceiver circuitry 50. Although not shown, the antenna tracker 74 discussed with respect to FIG. 9 may be included in the transceiver circuitry 100 to improve isolation between the RX circuit 54 and the TX circuit 52.

As discussed above, the RX signal 102 is received via the antenna and propagates through the transceiver circuitry 50 to the RX circuit 54. The RX signal 102 is split into a first portion 104 and a second portion 106 at the node 69. The first portion 104 propagates along the first path 62 and the second portion 106 propagates along the second path 64. The node 69 may not cause a phase shift of either the first portion 104 or the second portion 106 of the RX signal 102. Thus, the first portion 104 and the second portion 106 propagate to the isolation circuit 56 and are constructively combined thereby. The combined signal is then provided to the RX circuit 54 via the isolation circuit 56. The isolation circuit 56 also serves to prevent a TX signal from entering the RX circuit 54.

If the combiner circuit 72 (e.g., in the form of a balun), discussed with respect to FIG. 9, was used in place of the node 69, a phase of one or both of the first portion 104 and the second portion 106 may be shifted. In that case, a phase shifter disposed on one or both of the first path 62 and the second path 64 would shift a phase of a respective portion 104, 106 of the RX signal 102 such that the portions 104, 106 of the RX signal 102 would be in-phase at the isolation circuit 56. Thus, the portions 104, 106 of the RX signal 102 would then be in-phase at the isolation circuit and are constructively combined thereby. Combining the first portion 104 and the second portion 106 of the RX signal 102 reduces and/or substantially eliminates an insertion loss caused by splitting the RX signal, via the node 69 or the combiner circuit 72.

Figure 12:
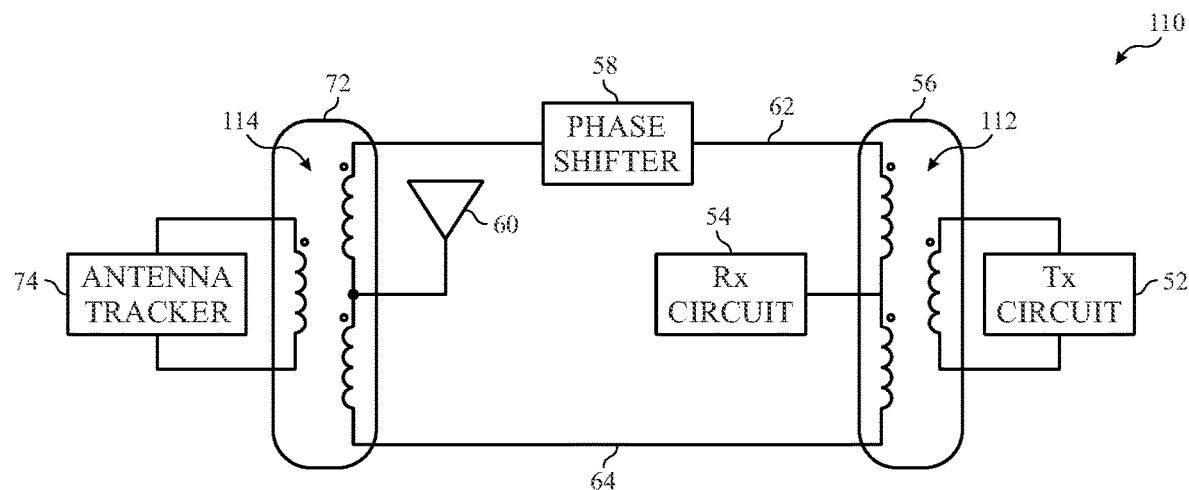
FIG. 12 is a schematic diagram of an example transceiver circuitry of the electronic device of FIG. 1 with baluns in the isolation circuit and the combiner circuit, according to an embodiment of the present disclosure.

FIG. 12 is a schematic diagram of an example transceiver circuitry 110 of the electronic device 10 with baluns 112, 114 for the isolation circuit 56 and the combiner circuit 72, according to an embodiment of the present disclosure. The transceiver circuitry 110 is substantially similar to the transceiver circuitry 70 discussed with respect to FIG. 9 except that the transceiver circuitry 110 includes example arrangements of the isolation circuit 56 and the combiner circuit 72.

As illustrated, the isolation circuit 56 and the combiner circuit 72 include a balance-unbalance transformer (balun) 112, 114, respectively. The balun 112 receives a TX signal from the TX circuit 52. The balun 112 isolates the RX circuit 54 from the TX signal based on the frequency of the TX signal. That is, the balun 112 cuts off the path of the TX signal to the RX circuit 54 as it prevent signals of a certain frequency range (including the TX signal) from crossing to the RX circuit 54, and instead directs such signals to the signal paths 62, 64. Thus, the balun 112 splits the TX signal into a first portion which propagates along the first path 62 and a second portion which propagates along the second path 64.

As discussed above, the balun 112 may shift a phase of one portion of the TX signal compared to the other portion of the TX signal. To compensate, the phase shifter 58 may shift a phase of the first portion of the TX signal to substantially correlate or match the phase of the second portion of the TX signal. Thus, the second portion of the TX signal from the balun 112 and the shifted first portion of the TX signal from the phase shifter 58 can be constructively combined and provided to the antenna 60. In this way, combining the signal paths 62, 64 and using the phase shifter 58 enable the transceiver circuitry 110 to reduce or substantially eliminate insertion loss caused by splitting the TX signal via the balun 112.

Similarly, an RX signal received by the antenna 60 is split by the balun 114. The RX signal is split into a first portion which propagates along the first path 62 and a second portion which propagates along the second path 64. The balun 114 may shift a phase of one portion of the RX signal compared to the other portion of the RX signal. To compensate, the phase shifter 58 may shift a phase of the first portion of the RX signal to substantially correlate or match the phase of the second portion of the RX signal. Thus, the second portion of the RX signal from the balun 114 and the shifted first portion of the RX signal from the phase shifter 58 can be constructively combined and provided to the RX circuit 54. In this way, combining the signal paths 62, 64 and using the phase shifter 58 enables the transceiver circuitry 110 to reduce or substantially eliminate all insertion loss caused splitting the RX signal via the balun 114.

As discussed above, the impedance of the antenna tracker 74 can be adjusted to offset an imbalance between an impedance of the antenna 60 and an impedance of the isolation circuit 56. Advantageously, the antenna tracker 74 enables further or improved isolation of the TX circuit 52 and the RX circuit 54 by reducing the impedance mismatch between the antenna 60 and the isolation circuit 56.

Figure 13:
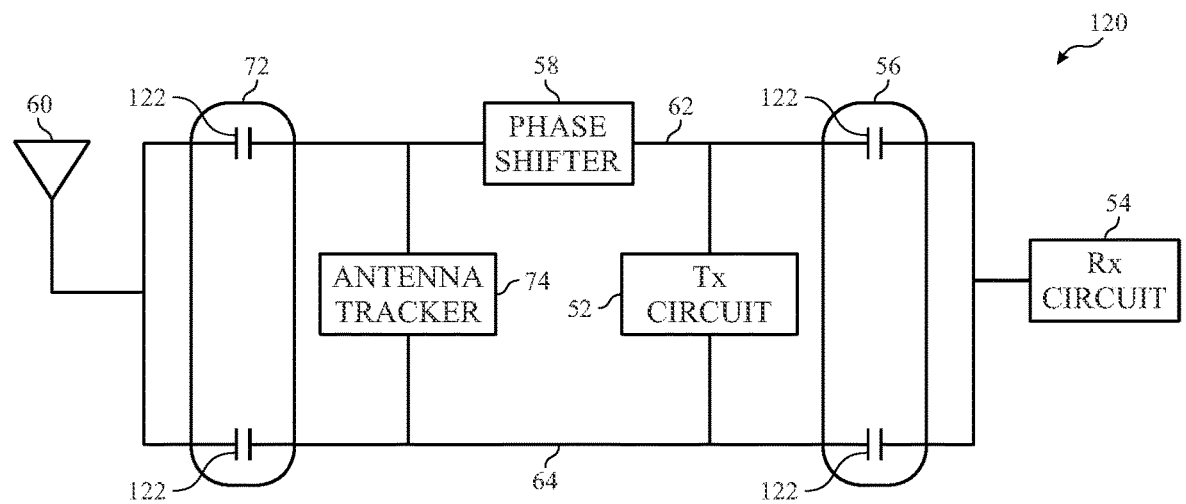
FIG. 13 is a schematic diagram of an transceiver circuitry of the electronic device of FIG. 1 with capacitors in the isolation circuit and the combiner circuit, according to an embodiment of the present disclosure.

FIG. 13 is a schematic diagram of an example transceiver circuitry 120 of the electronic device 10 with capacitors in the isolation circuit 56 and the combiner circuit 72, according to an embodiment of the present disclosure. The transceiver circuitry 120 is substantially similar to the transceiver circuitry 70 discussed with respect to FIG. 9 except that the transceiver circuitry 120 includes example arrangements of the isolation circuit 56 and the combiner circuit 72.

As illustrated, the isolation circuit 56 and the combiner circuit 72 include capacitors 122 disposed in parallel. For both the isolation circuit 56 and the combiner circuit 72, a first capacitor 122 is disposed on the first signal path 62 and a second capacitor 122 is disposed on the second signal path 64. The TX circuit 52 is coupled to the first path 62 and the second path 64 directly and the RX circuit 54 is coupled to the first path 62 and the second path 64 via the capacitors 122 of the isolation circuit 56. That is, the capacitors 122 of the isolation circuit 56 are disposed between and isolate the TX circuit 52 from an RX signal received by the antenna 60 and/or isolate RX circuit 54 from a TX signal to be transmitted. Similarly, the antenna tracker 74 is coupled to the first path 62 and the second path 64 directly and the antenna 60 is coupled to the first path 62 and the second path 64 via the capacitors 122 of the combiner circuit 72. Thus, the capacitors 122 of the combiner circuit 72 are disposed between the antenna tracker 74 from the antenna 60. The transceiver circuitry 120 combines paths for the TX signal, splits the RX signal, and enables impedance matching via the antenna tracker 74.

Advantageously, the capacitors 122 function substantially similar to the baluns 112, 114 discussed with respect to FIG. 12, but may be substantially easier to implement and provide cost savings over the baluns 112, 114. That is, the capacitors 122 along with the phase shifter 58 and the antenna tracker 74 enable any insertion loss caused by splitting the TX and RX signals to be reduced or substantially eliminated while isolating the TX circuit 52 from the RX signal and/or isolating from the RX circuit 54 from the TX signal.

Figure 14:
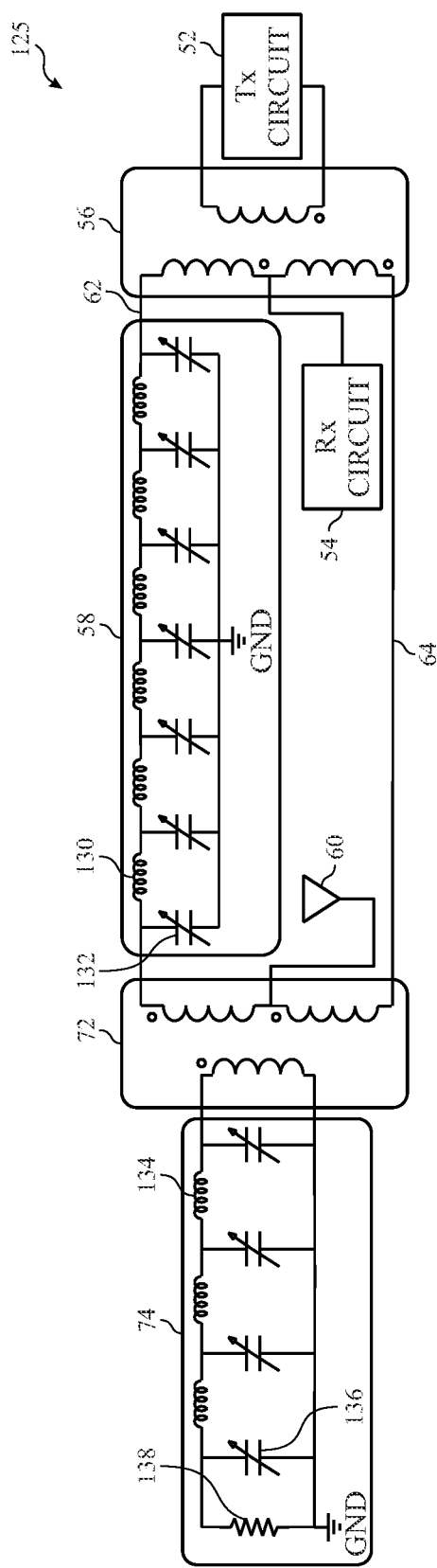
FIG. 14 is a schematic diagram of an example transceiver circuitry of the electronic device of FIG. 1 with example circuitry for baluns, a phase shifter, and an antenna tracker, according to an embodiment of the present disclosure.

FIG. 14 is a schematic diagram of an example transceiver circuitry 125 with example circuitry for the baluns 56, 72, the phase shifter 58, and the antenna tracker 74, according to an embodiment of the present disclosure. The transceiver circuitry 125 is substantially similar to the transceiver circuitry 70 discussed with respect to FIG. 9 except that the transceiver circuitry 125 includes example circuitry for the phase shifter 58 and the antenna tracker 74.

As illustrated, the phase shifter 58 includes multiple inductors 130 disposed in series with multiple variable capacitors 132 connected between the inductors 130 and coupled to ground. The variable capacitors 132 enable tuning of the amount of phase shift to a signal propagating therethrough, such that the phase of that signal on the first path 62 is shifted to substantially match the phase of the signal on the second path 64. As illustrated in FIG. 10, in some embodiments, the second path 64 may also include the phase shifter 58, and, as such, the variable capacitors 132 of each phase shifter 58 may shift the signals on the paths 62, 64 to correlate or match in phase.

The antenna tracker 74 includes multiple inductors 134 disposed in series with a variable capacitor 136 connected between the inductors 134 and coupled to ground. The antenna tracker 74 also includes a resistor 138 disposed in parallel with the variable capacitors 136 and coupled to ground. The variable capacitors 136 of the antenna tracker 74 enable an impedance of the antenna tracker 74 to be tuned to offset an impedance imbalance between the antenna 60 and the isolation circuit 56. That is, the variable capacitors 136 may be used to improve or maintain a suitable level of isolation between the TX circuit 52 and the RX circuit 54.

The variable capacitors 132, 136 may be coupled to and controlled by a controller (not shown). The processor 12, discussed with respect to the electronic device 10 of FIG. 1, may instruct the controller to adjust a capacitance of the variable capacitors 132, 136 to a suitable value. In some embodiments, the controller may include the processor 12.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A radio frequency transceiver comprising:
one or more antennas configured to receive a receive signal;
a transmit circuit configured to transmit a transmission signal;
a receive circuit;
combiner circuit configured to split the receive signal into a first portion and a second portion; and
an isolation circuit configured to couple to the one or more antennas, and the receive circuit, the isolation circuit being configured to isolate the transmit circuit from the receive signal, isolate the receive circuit from the transmission signal, and constructively combine the first portion of the receive signal and the second portion of the receive signal at the receive circuit.

2. The radio frequency transceiver of claim 1, comprising an antenna tracker coupled to the combiner circuit and configured to match an impedance of the one or more antennas to an impedance of the isolation circuit.

3. The radio frequency transceiver of claim 1, comprising a first phase shifter disposed on a first signal path and a second phase shifter disposed on a second signal path.

4. The radio frequency transceiver of claim 3, wherein the first phase shifter and the second phase shifter are configured to cause the first portion of the receive signal on the first signal path to be in phase with the second portion of the receive signal on the second signal path.

5. The radio frequency transceiver of claim 3, wherein the first phase shifter is configured to shift a phase of the first portion of the receive signal on the first signal path by +90 degrees and the second phase shifter is configured to shift a phase of the second portion of the receive signal on the second signal path by −90 degrees.

6. The radio frequency transceiver of claim 1, comprising at least one phase shifter configured to shift a phase of the first portion of the receive signal by 180 degrees.

7. The radio frequency transceiver of claim 6, wherein the isolation circuit is configured to split the transmission signal from the transmit circuit into a first portion and a second portion, and the at least one phase shifter is configured to shift a phase of the first portion of the transmission signal to be in phase with a phase of the second portion of the transmission signal.

8. The radio frequency transceiver of claim 1, wherein the combiner circuit comprises at least one of a balun, a Wilkinson power divider, a T-line junction, or a node.

9. The radio frequency transceiver of claim 1, wherein the combiner circuit comprises a balun configured to shift a phase of the first portion the receive signal or a phase of the second portion of the receive signal.

10. The radio frequency transceiver of claim 1, wherein the isolation circuit couples to the one or more antennas via a first signal path and a second signal path.

11. An electronic device comprising:
one or more antennas;
a balun coupled to the one or more antennas via a first signal path and a second signal path;
at least one phase shifter disposed on the first signal path;
receiver circuitry coupled to the balun; and
transmitter circuitry coupled to the balun opposite the receiver circuitry, the balun configured to receive a transmission signal from the transmitter circuitry and split the transmission signal into a first portion and a second portion, the at least one phase shifter configured to shift the first portion of the transmission signal such that the first portion of the transmission signal and the second portion of the transmission signal constructively combine prior to propagating to the one or more antennas.

12. The electronic device of claim 11, wherein the balun is configured to output the first portion of the transmission signal on the first signal path to be out of phase with the second portion of the transmission signal on the second signal path.

13. The electronic device of claim 12, wherein the at least one phase shifter is configured to phase shift the first portion of the transmission signal by +90 degrees.

14. The electronic device of claim 11, comprising combiner circuitry configured to receive the first portion of the transmission signal and the second portion of the transmission signal.

15. The electronic device of claim 14, wherein the combiner circuitry is configured to receive a receive signal from the one or more antennas, and split the receive signal along the first signal path and the second signal path.

16. The electronic device of claim 14, wherein the combiner circuitry comprises a second balun coupled to the balun via the first signal path and the second signal path.

17. The electronic device of claim 16, comprising an antenna tracker coupled to the second balun opposite the one or more antennas.

18. The electronic device of claim 11, wherein the at least one phase shifter comprises a plurality of inductors disposed in series, each inductor of the plurality of inductors being coupled to a capacitor.

19. An electronic device comprising:
one or more antennas coupled to a first signal path and a second signal path and configured to receive a receive signal;
receiver circuitry;
combiner circuitry configured to split the receive signal into a first portion and a second portion, the first portion propagating along the first signal path and the second portion propagating along the second signal path;
at least one phase shifter coupled to the combiner circuitry along the first signal path and configured to shift the first portion of the receive signal; and
at least one balun coupled to the first signal path, the second signal path, and the receiver circuitry, the at least one balun configured to constructively combine the first portion and the second portion prior to propagating the receive signal to the receiver circuitry.

20. The electronic device of claim 19, comprising transmitter circuitry configured to transmit a transmission signal, the at least one balun being configured to split the transmission signal into a third portion to propagate along the first signal path and a fourth portion to propagate along the second signal path, and the combiner circuitry being configured to constructively combine the third portion and the fourth portion prior to propagating the transmission signal to the one or more antennas.

* * * * *